3,677,960
GLASS LASER MATERIALS
Masahiko Ishiyama, Yokohama, Japan, assignor to Asahi Glass Co., Ltd., Tokyo, Japan
Filed June 29, 1970, Ser. No. 50,525
Claims priority, application Japan, July 3, 1969, 44/52,186
Int. Cl. C09k 1/04, 1/54; C03c 3/04
U.S. Cl. 252—301.4 F
6 Claims

ABSTRACT OF THE DISCLOSURE

A silicate glass for use as a glass laser material doped with trivalent neodymium contains $Sb_2O_3$ as well as $TiO_2$, $MoO_3$, $Nb_2O_5$, $WO_3$, $Bi_2O_3$ and/or $Ta_2O_5$. The combination of these components prevents deterioration in laser performance due to solarization.

BACKGROUND OF THE INVENTION

This invention relates to a neodymium-doped glass laser material, more particularly, the invention relates to a silicate glass for use as a glass laser material doped with trivalent neodymium, and particularly to the prevention of deteriorations in laser performance of the glass due to solarization.

DESCRIPTION OF THE PRIOR ART

A neodymium-doped glass laser is known to be an excellent solid laser, for it functions at room temperature with a low threshold energy and is even capable of continual emission.

Furthermore, this glass laser is less expensive than lasers composed of crystals such as of ruby, and glass offers the advantage that it can be easily fabricated into large rods.

Recently, the neodymium-doped glass alser has been used as a giant pulse laser and, as such, is being required to produce an ever higher output energy. To yield a high output energy, there is required a high input energy, that is to say, exposure to an intense flash of light such as one originating from a xenon flash-lamp. Such an intense light contains a large amount of ultraviolet radiation.

A glass laser rod which has been repeatedly exposed to ultraviolet radiation undergoes a process known as solarization and is more or less browned. This peripheral discoloration of the rod is necessarily accompanied by an increase in input threshold energy and a decrease in output energy of the laser.

In the production of glass, antimony oxide ($Sb_2O_3$) has been conventionally added for the removal of bubbles and, in glass lasers, this compound has been believed to prevent solarization in some measure. However, my study has shown that the anti-solarization effect of $Sb_2O_3$ is substantially limited to the visible region of the spectrum and is insignificant in the ultraviolet region. In fact, even in the visible region, some reduction in transmission of the glass due to solarization has been noted.

In a neodymium-doped glass laser, the dominant absorption by the activating agent $Nd^{3+}$ is in the neighborhood of 5800 angstrom units, and this dominant absorption is masked by the increase in absorption by the glass itself in the visible region of the spectrum, with the result that the efficiency of the laser is reduced. In addition, because about 40 percent of the energy used for the excitation of $Nd^{3+}$ is derived from light of wavelengths shorter than 4000 angstrom units, it is necessary, also, to prevent the solarization in the ultraviolet region.

SUMMARY OF THE INVENTION

It is a principal object of this invention to provide a neodymium-doped glass laser material which will not suffer a reduction in laser performance due to solarization even on repeated laser emission.

Another object of this invention is to provide a neodymium-doped glass laser material comprising silicate glass with constituents conducive to the prevention of solarization in the ultraviolet to visible region of the spectrum.

Other objects and advantages of this invention will become apparent as the following description of the invention proceeds.

Thus, this invention provides a neodymium-doped glass laser material based on silicate glass which is substantially free of solarization after repeated exposure to intense light, said silicate glass containing, in a combined total proportion not exceeding 20 percent by weight of the glass, from 0.5 to 10 percent by weight of antimony oxide ($Sb_2O_3$) and at least one oxide selected from the group consisting of from 4 to 15 percent by weight of titanium oxide ($TiO_2$), from 0.2 to 15 percent by weight of molybdenum oxide ($MoO_3$), from 0.2 to 15 percent by weight of nibium oxide ($Nb_2O_5$), from 0.2 to 15 percent by weight of tungsten oxide ($WO_3$), from 0.2 to 15 percent by weight of bismuth oxide ($Bi_2O_3$) and from 0.2 to 15 percent by weight of tantalum oxide ($Ta_2O_5$).

DETAILED DESCRIPTION OF THE PREFERRED EMBODIMENTS

Figure 1:
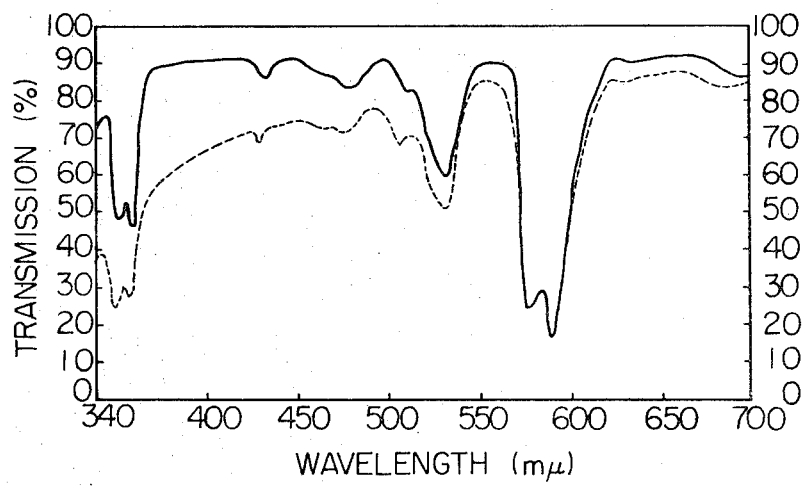
FIGS. 1 through 12 show the spectral transmission curves of the twelve glass plate samples given in Table 1 of Example 1, respectively, before and after irradiation with light from a xenon flashlamp.
Figure 2:
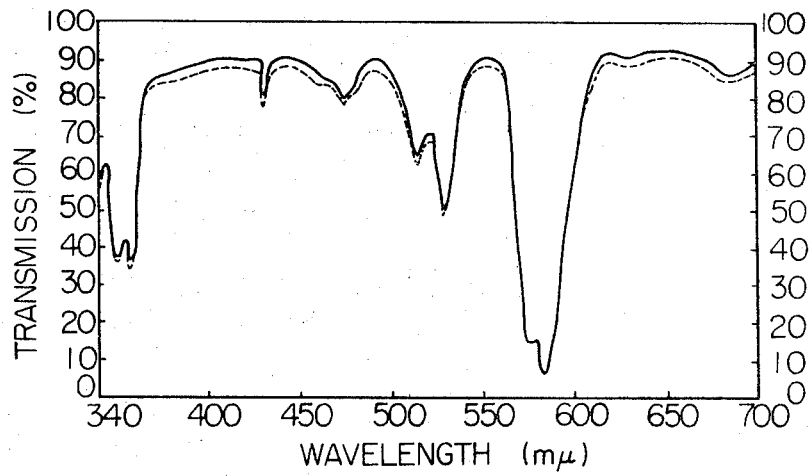
Figure 3:
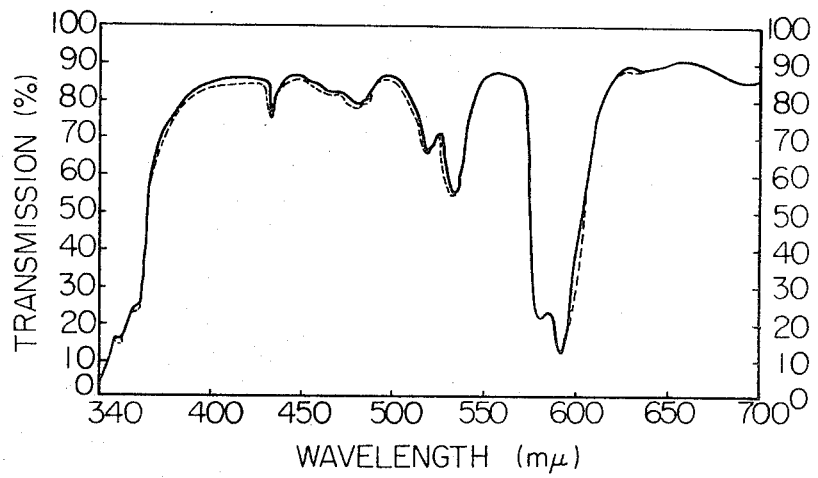
Figure 4:
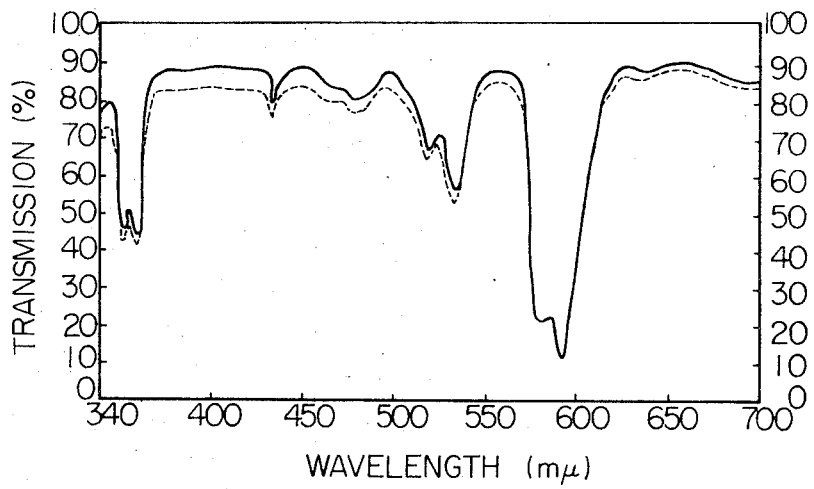
Figure 5:
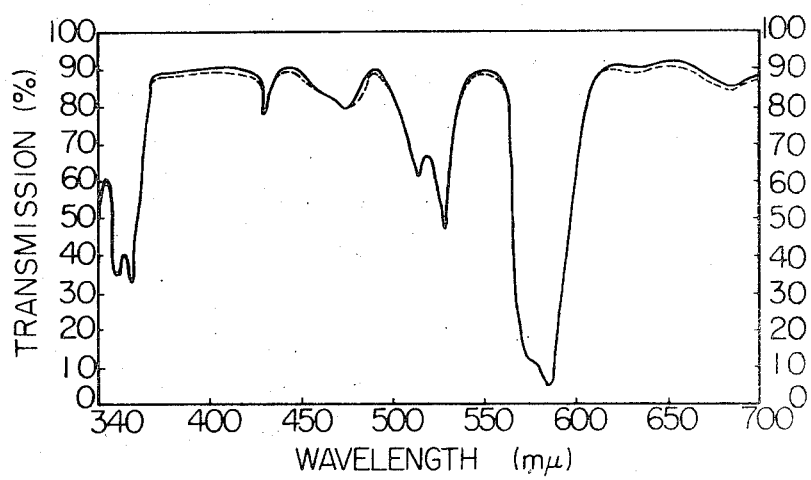
Figure 6:
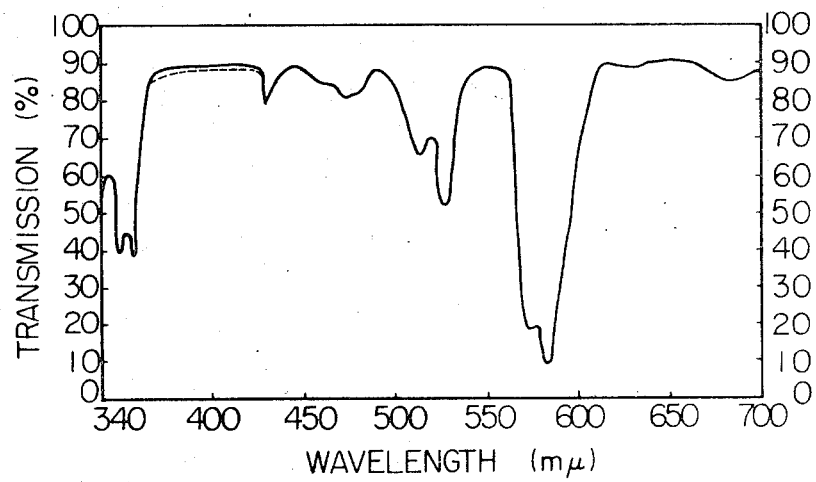
Figure 7:
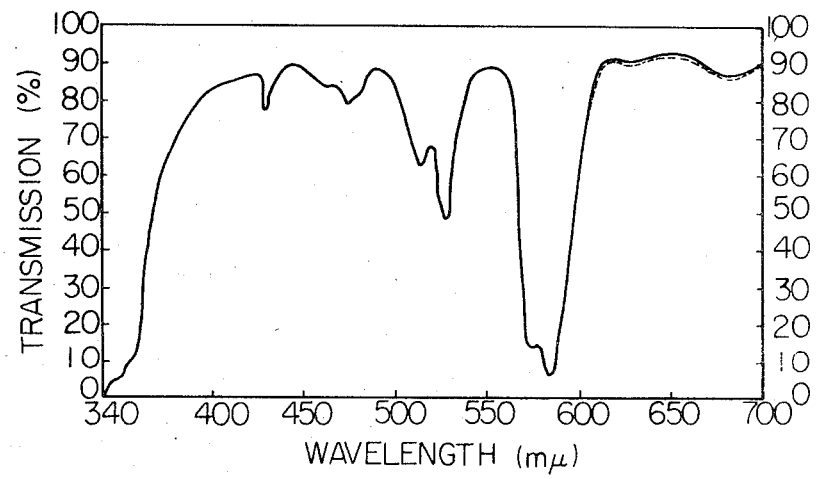
Figure 8:
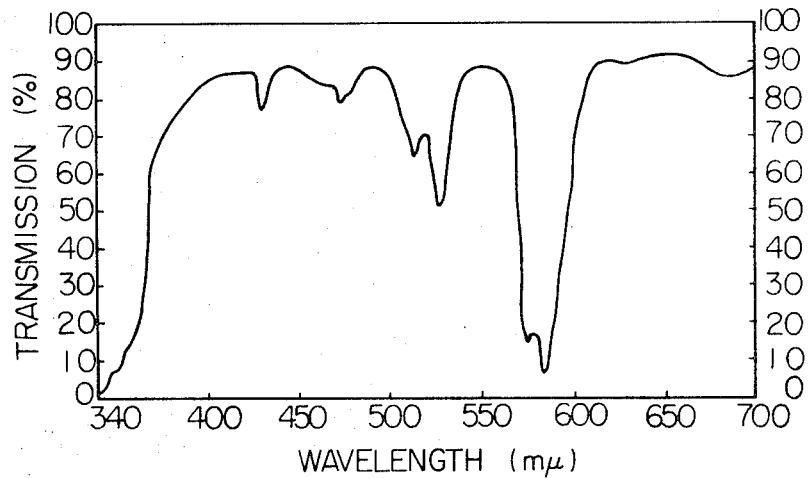
Figure 9:
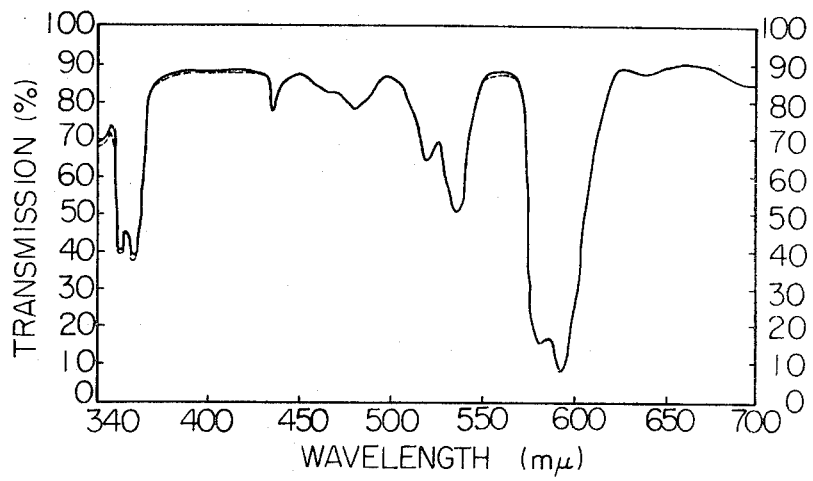
Figure 10:
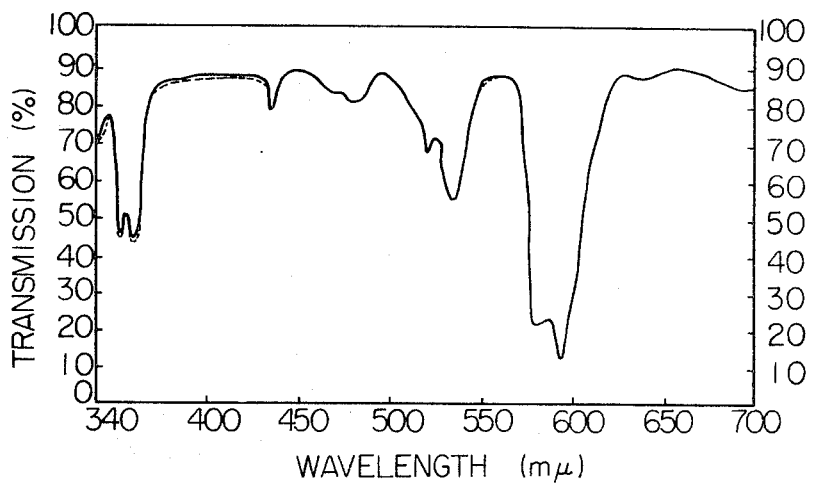
Figure 11:
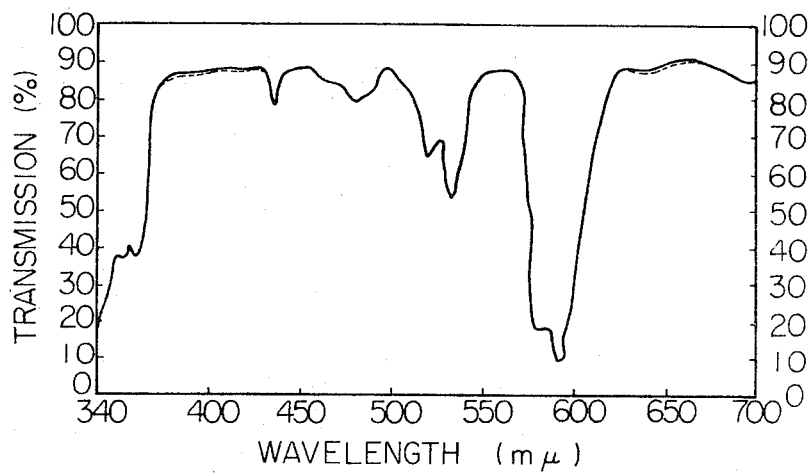
Figure 12:
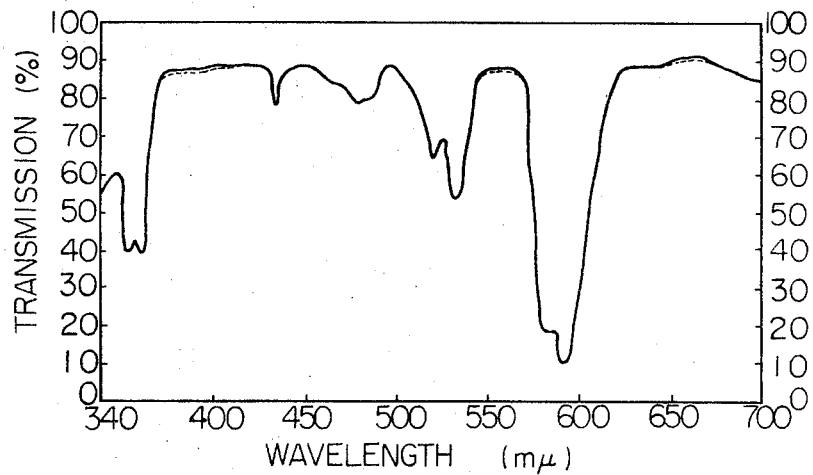

Silicate glass is used as the base glass for the neodymium-doped glass laser material. More particularly, use is made of soda-lime glass ($Na_2O$—$CaO$—$SiO_2$), barium crown glass ($K_2O$—$BaO$—$SiO_2$), or, if a monovalent metal oxide, divalent metal oxide and trivalent metal oxide are designated as $R_2O$, $RO$ and $R_2O_3$, respectively, the silicate glass formula may generally be written as $R_2O$—$RO$—$SiO_2$ or $R_2O$—$RO$—$R_2O_3$—$SiO$. In the base glass composition, $R_2O$ may be $Li_2O$, $Na_2O$ or/and $K_2O$, $RO$ may be $CaO$, $MgO$, $BaO$ or/and $SrO$, and $R_2O_3$ may be $Al_2O_3$ or/and $B_2O_3$.

The amount of the neodymium to be doped as an activating agent onto base glass is preferably in the range of from 0.25 to 8 percent by weight in terms of $Nd_2O_3$, the optimum proportion being from 2 to 6 percent by weight on the same basis.

The preferred and optimum ranges of these components in the glass laser material of this invention are as follows on a percent by weight basis.

| Components | Preferred range | Optimum range |
| --- | --- | --- |
| $SiO_2$ | 50–75 | 55–70 |
| $R_2O$ ($Li_2O$, $Na_2O$, $K_2O$) | 5–40 | 10–30 |
| $RO$ ($CaO$, $MgO$, $BaO$, $SrO$) | 0–25 | 5–20 |
| $Al_2O_3$ | 0–10 | 0–5 |
| $B_2O_3$ | 0–10 | 0–5 |
| $Nd_2O_3$ | 0.25–8 | 2–6 |

Regarding the $SiO_2$ content of the glass, if it exceeds 75 percent by weight, the viscosity of the glass will be too high for efficient melting, while the presence of $SiO_2$ in an amount less than 50 percent by weight will cause reductions in chemical durability and fluorescent intensity of the glass, and a reduction in laser performance due to the reduced fluorescent lifetime.

If the amount of $R_2O$ is in excess of 40 percent by weight, the glass will suffer a reduction in chemical durability and is liable to get devitrified. If the $R_2O$ content of the glass is less than 5 percent by weight, the viscosity of the glass melt will be increased and the fluorescent lifetime of the glass will be reduced.

The presence of RO is conductive to improvements in both chemical durability and melting characteristics of glass, but the glass is ready to devitrify as the amount of RO exceeds 25 percent by weight. The fluorescent intensity and fluorescent lifetime of glass will also be reduced under such conditions.

Though $Al_2O_3$ or $B_2O_3$ is an optional additive, the presence of either of them in a proportion of more than 10 percent by weight will shorten the fluorescent lifetime of glass.

In accordance to this invention, to prevent solarization of the glass laser material having the described composition, $Sb_2O_3$ and at least one oxide selected from the group consisting of $TiO_2$, $MoO_3$, $Nb_2O_5$, $WO_3$, $Bi_2O_3$ and $Ta_2O_5$ are incorporated in the material in a combined total proportion of not exceeding 20 percent by weight relative to the total glass. My studies have shown that the latter group of oxides are capable of absorbing ultraviolet rays of comparatively long wavelengths; while $Sb_2O_3$ is not. This fact is ascertained by measurements of spectral transmissions of glass samples containing those oxides. For example, in the spectral transmission curve of a 3 millimeter-thick glass plate containing 1 percent by weight of $Sb_2O_3$, the absorption edge wavelength, that is the wavelength below which light will not be transmitted is 290 m$\mu$. In contrast, the absorption edge wavelengths for glass samples containing 5 percent by weight of $TiO_2$ or 5 percent by weight of $MoO_3$ are 319 m$\mu$ and 336 m$\mu$, respectively.

When excited by exposure to light from a xenon flashlamp, glass lasers containing any of the oxides of Ti, Mo, Nb, W, Bi and Ta absorb light of comparatively long wavelengths, preventing color centers from being formed in the glass. However, increasing the input energy not only increases the ultraviolet radiation from a light source such as a xenon flashlamp but also shifts the radiation in the shorter wavelength direction. By the accumulation of exposure to ultraviolet rays of such shorter wavelengths, the solarization of the glass laser progresses by degrees. Particularly, repeated laser emissions with a high input energy inevitably lead to reductions in output energy.

On the other hand, the conventional glass laser containing the oxide of Sb alone is vulnerable to solarization under exposure to radiation of wavelengths longer than the aforementioned absorption edge and, therefore, if the glass laser is excited by a xenon flashlamp, the laser is easily degraded.

However, it has been discovered that if the oxide of Sb is present in glass along with the oxide of any one of Ti, Mo, Nb, W, Bi and Ta as specified according to this invention, the resulting glass laser will be completely or substantially free of solarization under an extremely high input energy.

It appears that the presence of the two oxides yields a synergistic effect.

The oxides to be incorporated in glass for the purpose of preventing the solarization of glass lasers will hereinafter be generally called "anti-solarizers" or "anti-solarizing agents."

The permissible ranges and preferred ranges of anti-solarizers, when used singly and independently, are shown below on a weight percent basis.

| Anti-solarizer | Permissible range | Preferred range |
| --- | --- | --- |
| $Sb_2O_3$ | 0.5–10 | 0.5–2 |
| $TiO_2$ | 4–15 | 4–10 |
| $MoO_3$ | 0.2–15 | 0.5–10 |
| $Nb_2O_5$ | 0.2–15 | 0.5–10 |
| $WO_3$ | 0.2–15 | 1–10 |
| $Bi_2O_3$ | 0.2–15 | 1–5 |
| $Ta_2O_5$ | 0.2–15 | 1–10 |

The lower limit for each anti-solarizer is prescribed because the particular anti-solarizer will not be effective in the prevention of solarization when it is used in amounts less than that limit, while the upper limit is prescribed for the reason that, if it occurs in any amount in excess of the limit, it will be difficult to manufacture a homogeneous glass and the fluorescent intensity of the product will be too low to ensure a satisfactory laser performance. It is for the same reasons as stated above that the combined amount of anti-solarizers is restricted to no more than 20 percent by weight and, preferably, to no more than 10 percent by weight.

It should be understood, in this connection, that the following components are undesirable in base glass for the production of the glass laser of this invention.

Thus, $As_2O_3$, $Pr_2O_3$, $PbO$, $Ag_2O$, $Yb_2O_3$, S and I should not be present in a combined amount in excess of about 1 percent by weight, for they tend to promote solarization of glass. The concentration of components giving absorptions at the emission wavelength (1.06$\mu$) of the neodymium-doped glass laser, such as $CuO$, $FeO$, $Sm_2O_3$, $V_2O_5$, $UO_3$, etc. should not exxceed approximately 0.1 percent by weight. Furthermore, the concentration of components giving intense absorptions in the visible region of the spectrum, such as $Cr_2O_3$, $Co_2O_3$, $Ni_2O_3$ and $MnO_2$, should not exceed the limit of about 0.1 percent, for they tend to mask the $Nd^{3+}$, which is the activating agent of the glass laser, and interfere with its excitation.

The following examples are given to further illustrate this invention and should by no means be construed as being limitative of the scope of the invention which is particularly set forth in this specification and the claims appended thereto.

EXAMPLE 1

The twelve glass samples described in Table 1 were prepared. The base glass used was soda-lime glass for all the samples, but the molar ratios of $Na_2O$, CaO and $SiO_2$ were 1:1:7 in Sample 1 and 1:2:5 in Samples 2 to 12.

Those glass samples were prepared as follows. A batch of reagent grade raw materials was heated in a platinum crucible at 1450° C. for 4 hours, whereby a melt was prepared. The melt was homogenized by stirring with a platinum stirrer and cast into a plate. This glass plate was annealed and polished to a finished size of 12 x 10 x 3 millimeters.

The glass plates, while being cooled with water, were repeatedly exposed to light from a helical xenon flashlamp. The energy for the xenon flashlamp was obtained from a power supply containing capacitors. In this test, the capacitance of the power supply was constant at 100 $\mu f$. and the voltage was also constant at 5 kv. An energy of 1250 joules was supplied to the lamp. Each sample was irradiated 100 or 1600 times at intervals of from 12 to 15 seconds.

TABLE 1

| Sample Number | Glass composition (percent by weight) | | | | | | | | | | | |
|---|---|---|---|---|---|---|---|---|---|---|---|---|
| | 1 | 2 | 3 | 4 | 5 | 2 | 7 | 6 | 9 | 10 | 11 | 12 |
| Component: | | | | | | | | | | | | |
| Base glass component: | | | | | | | | | | | | |
| $SiO_2$ | 77.8 | 63.2 | 23.6 | 63.6 | 60.2 | 62.9 | 61.5 | 62.9 | 62.9 | 62.9 | 62.9 | 62.9 |
| $Na_2O$ | 11.5 | 13.1 | 13.1 | 13.1 | 12.4 | 13.0 | 12.7 | 13.0 | 13.0 | 13.0 | 13.0 | 13.0 |
| CaO | 6.7 | 15.3 | 15.3 | 15.3 | 14.4 | 15.1 | 14.8 | 15.1 | 15.1 | 15.1 | 1.51 | 15.1 |
| Activating agent: $Nd_2O_3$ | 3.0 | 3.0 | 3.0 | 3.0 | 3.0 | 3.0 | 3.0 | 3.0 | 3.0 | 3.0 | 3.0 | 3.0 |
| Anti-solarizer: | | | | | | | | | | | | |
| $Sb_2O_3$ | 1.0 | | | | | 1.0 | 3.0 | 1.0 | 1.0 | 1.0 | 1.0 | 1.0 |
| $TiO_2$ | | 5.0 | | | 5.0 | 5.0 | 5.0 | | | | | |
| $MoO_3$ | | | 5.0 | | | | | 5.0 | | | | |
| $Nb_2O_5$ | | | | 5.0 | | | | | 5.0 | | | |
| $WO_3$ | | | | | 5.0 | | | | | 5.0 | | |
| $Bi_2O_3$ | | | | | | | | | | | 5.0 | |
| $Ta_2O_5$ | | | | | | | | | | | | 5.0 |

The number of exposures for each sample glass plate is set forth below.

Sample No.:     Numbers of repeated exposure
1 ........ 1600
2 ........ 1600
3 ........ 1600
4 ........ 1600
5 ........ 100
6 ........ 100
7 ........ 1600
8 ........ 1600
9 ........ 1600
10 ....... 1600
11 ....... 1600
12 ....... 1600

The spectral transmissions of each sample before and after exposure were measured with a spectrophotometer at an optical path of 3 millimeters to examine the degree of solarization that had taken place as a result of exposure.

FIGS. 1 through 12 show the spectral transmission curves of the corresponding sample glass plates at wavelengths from 340 to 700 m$\mu$. The numbers of the figures correspond to the sample numbers. The curves shown by the solid and dotted lines represent the spectral transmissions of each sample before and after exposure, respectively. Where the solid line coincides with the dotted line, that is if there is no difference in transmission before and after exposure, the solid line alone is shown.

The glass of Sample No. 1 containing $Sb_2O_3$ as an exclusive anti-solarizer, and the glass samples designated as Sample Nos. 2, 3, 4 and 5 containing $TiO_2$, $MoO_3$, $WO_3$ and $TiO_2+Nb_2O_5$, respectively, as will be seen from FIGS. 1 to 5, show significant reductions in transmission due to solarization upon exposure.

In contrast, the glass samples according to this invention, herein designated as Sample No. 6 to No. 12, which contain $Sb_2O_3$ and one of $TiO_2$, $MoO_3$, $Nb_2O_3$, $WO_3$, $Bi_2O$, $Ta_2O_5$ or a mixture thereof, as will be seen from FIGS. 6 through 12, show either no reductions or only negligible reductions in transmission on exposure. It is particularly noteworthy that the glass samples containing $Sb_2O_3$ and $TiO_2$ as anti-solarizers and the glass containing $Sb_2O_3$ and $MoO_3$ (Sample Nos. 6, 7 and 8) show practically no reductions in transmission due to solarization.

EXAMPLE 2

From the glass samples designated as Sample Nos. 1, 2, 6 and 8 (Table 1), glass rods 100 millimeters long and 6.5 millimeters in diameter were prepared and both ends of each rod were polished to a close tolerance. Each rod was provided with reflectors of 100% and 50% reflectivities, spaced apart from both ends, and was placed between two straight cylindrical xenon flashlamps. Cooling water was passed between the rod and flashlamp. The laser rods were excited with input energies from about 500 joules to 1500 joules at intervals of 12 to 15 seconds, and 50 to 300 repeated emissions were induced.

The output energies before and after this repeated laser emission were measured to ascertain the possible deterioration in laser performance due to solarization.

FIGS. 13, 14, 15 and 16 show the output energy curves of glass lasers made from Sample Nos. 1, 2, 6 and 8, respectively, in which the input energy (energy fed to the xenon flashlamp) was plotted on the horizontal axis and the output energy on the vertical axis. In each instance, the output energy after 50 repeated emissions is represented by black triangles, the output energy after 100 emissions by white circles; and the output energy after 300 emissions by white triangles. It should be understood that since there was no reduction in output energy in the case of Sample No. 6 and No. 8 (FIGS. 15 and 16), only the output energies before emission and after 300 emissions were plotted.

The glass laser made from Sample 1 glass containing only 1 percent by weight of $Sb_2O_3$ suffered a significant reduction in output energy due to the repeated emission.

Figure 13:
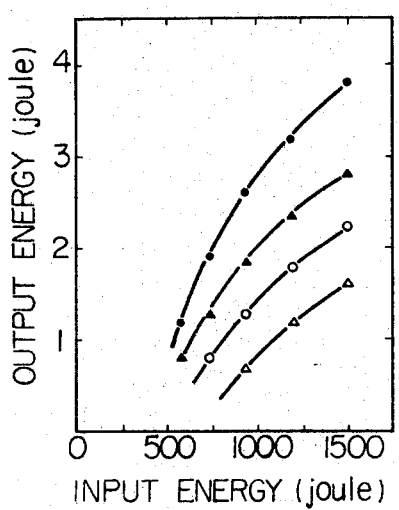
FIGS. 13 through 16 show the output energy curves plotted against input energies before and after the emission of glass lasers made from four of the glass samples.
Figure 14:
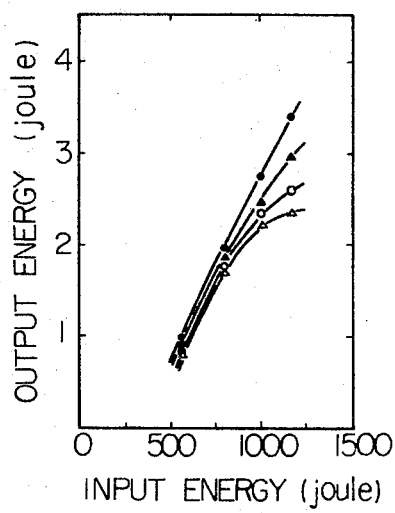

For example, with an input energy of 1500 joules, the output energy dropped by about 50 percent as measured after 300 emissions (see FIG. 13).

As for the glass laser of Sample No. 2 which contains 5% by weight of $TiO_2$ alone, when the input energy was about 1200 joules, the output energy dropped by about 30 percent as measured after 300 emissions. (See FIG. 14.)

Figure 15:
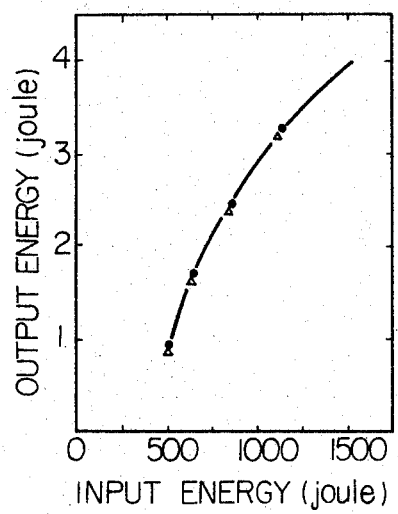
Figure 16:
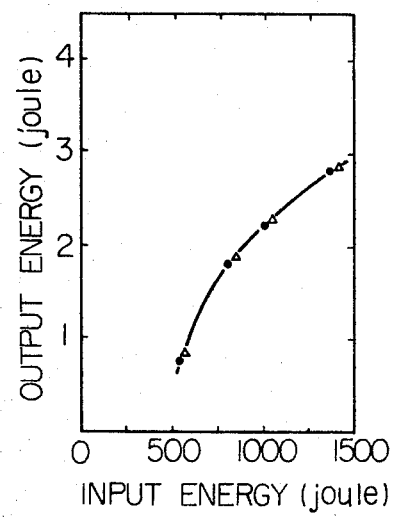

This is in sharp contrast to the glass lasers of this invention which showed no reduction in output energy even after 50–300 emissions (see FIGS. 15 and 16).

EXAMPLE 3

Glass melts of the compositions given in Table 2 were prepared, and rods were fabricated from the glass melts by the procedure described in Example 2.

The rods were tested by the method described in Example 2. The results show that, after repeated emissions, the lasers showed substantially no deterioration due to solarization.

amount of said antisolarizing agents being not greater than 10%.

3. A glass as set forth in claim 1, wherein the remainder of said glass other than said antisolarizing agents essentially consists of 50%–75% $SiO_2$, 5%–40% $Li_2O+Na_2O+K_2O$, 0%–25% $CaO+MgO+BaO+SrO$, 0%–10% $Al_2O_3$, 0%–10% $B_2O_3$, and 0.25%–8% $Nd_2O_3$.

4. A glass as set forth in claim 1, wherein said at least one oxide is $MoO_3$, $Nb_2O_5$, $WO_3$, or $Ta_2O_5$.

5. A glass as set forth in claim 1, wherein said at least one oxide is $Bi_2O_3$.

6. A glass as set forth in claim 1, wherein said at least one oxide is $TiO_2$.

TABLE 2

| Component | \multicolumn{13}{c}{Glass composition (percent by weight)} |
|---|---|---|---|---|---|---|---|---|---|---|---|---|---|
| | 13 | 14 | 15 | 16 | 17 | 18 | 19 | 20 | 21 | 22 | 23 | 24 | 25 |
| $SiO_2$ | 64.3 | 68.1 | 61.5 | 52.1 | 55.5 | 53.3 | 61.7 | 61.7 | 61.7 | 70.0 | 56.0 | 56.0 | 61.7 |
| $B_2O_3$ | 4.3 | 4.9 | 3.9 | | | | | | | | | | |
| $Al_2O_3$ | | | | | 4.5 | 4.5 | 4.5 | | | | | | |
| $Li_2O$ | | | | | | | | | | | | | 12.5 |
| $Na_2O$ | 8.1 | 8.6 | 7.7 | | | | 11.8 | 11.8 | 12.8 | 5.5 | | | |
| $K_2O$ | 11.7 | 11.2 | 11.4 | 22.2 | 20.6 | 21.0 | | | | 16.5 | 32.5 | 27.0 | |
| $MgO$ | | | 2.5 | | | | | | 12.5 | | | | |
| $CaO$ | | | | 11.6 | 8.7 | 7.7 | 12.5 | 9.0 | | | | | 17.8 |
| $BaO$ | 2.6 | | | | | | | | | 1.0 | | | 2.0 |
| $SrO$ | | 2.7 | | | | | | | 2.0 | | 1.5 | 1.5 | |
| $Nd_2O_3$ | 3.0 | 3.0 | 2.0 | 2.5 | 2.5 | 2.0 | 2.5 | 2.0 | | 2.0 | 5.0 | 3.0 | 2.0 |
| $Sb_2O_3$ | 1.0 | 1.0 | 1.0 | 2.0 | 0.7 | 1.0 | 2.0 | 8.0 | 1.0 | 1.0 | 2.0 | 1.0 | 1.0 |
| $TiO_2$ | | | | | | | 5.0 | | | | 10.0 | | |
| $MoO_3$ | | 0.5 | | | 1.0 | | | | | 5.0 | | 1.5 | 1.5 |
| $Nb_2O_5$ | 5.0 | | | | | | 15.0 | | | | | | |
| $WO_3$ | | | | 11.0 | | | | | | 1.5 | 1.5 | | |
| $Bi_2O_3$ | | | 10.0 | | | | | 3.0 | 0.5 | 2.5 | | | 1.5 |
| $Ta_2O_5$ | | | | 9.6 | | | | | | | 1.5 | | |

I claim:

1. A silicate glass doped with trivalent neodymium sufficient for use of the glass as a laser material and containing, as antisolarizing agents, not more than 20% of a combination of 0.5%–10% $Sb_2O_3$ with at least one oxide selected from the group consisting of 4%–15% $TiO_2$, 0.2%–15% $MoO_3$, 0.2%–15% $Nb_2O_5$, 0.2%–15% $WO_3$, 0.2%–15% $Bi_2O_3$, and 0.2%–15% $Ta_2O_5$, all percentage figures being by weight of said glass.

2. A glass as set forth in claim 1, wherein said combination essentially consists of 0.5%–2.0% $Sb_2O_3$ and at least one oxide selected from the group consisting of 4%–10% $TiO_2$ and 0.5%–10% $MoO_3$, the combined References Cited

UNITED STATES PATENTS

| 3,457,182 | 7/1969 | Lee, Jr. et al. | 106—52 |
| 3,528,927 | 9/1970 | Graf et al. | 106—52 |
| 3,471,409 | 10/1969 | Lee, Jr. et al. | 106—52 |

FOREIGN PATENTS

| 1,344,970 | 10/1963 | France | 106—52 |

TOBIAS E. LEVOW, Primary Examiner

M. L. BELL, Assistant Examiner

U.S. Cl. X.R.

106—52